United States Patent
Karlsson et al.

(10) Patent No.: US 7,801,188 B2
(45) Date of Patent: Sep. 21, 2010

(54) CONTINUOUS-WAVE ULTRAVIOLET LASER

(75) Inventors: Håkan Karlsson, Stockholm (SE); Jonas Hellström, Sollentuna (SE)

(73) Assignee: Cobolt AB, Stockholm (SE)

( * ) Notice: Subject to any disclaimer, the term of this patent is extended or adjusted under 35 U.S.C. 154(b) by 0 days.

(21) Appl. No.: 11/730,485

(22) Filed: Apr. 2, 2007

(65) Prior Publication Data
US 2008/0240177 A1    Oct. 2, 2008

(51) Int. Cl.
*H01S 3/109*    (2006.01)
*H01S 3/0941*    (2006.01)

(52) U.S. Cl. ............................. 372/22; 372/21; 372/75; 372/98

(58) Field of Classification Search .................. 372/20, 372/21, 75, 98
See application file for complete search history.

(56) References Cited

U.S. PATENT DOCUMENTS

| | | | | |
|---|---|---|---|---|
| 5,787,102 | A * | 7/1998 | Alexander et al. | 372/22 |
| 5,809,048 | A * | 9/1998 | Shichijyo et al. | 372/32 |
| 5,850,407 | A | 12/1998 | Grossman et al. | |
| 6,175,578 | B1 * | 1/2001 | Ito | 372/10 |
| 6,347,102 | B1 * | 2/2002 | Konno et al. | 372/22 |
| 6,714,569 | B2 | 3/2004 | Zhu et al. | |
| 2005/0058165 | A1 * | 3/2005 | Morehead et al. | 372/39 |
| 2005/0078718 | A1 * | 4/2005 | Spinelli et al. | 372/22 |
| 2005/0238071 | A1 * | 10/2005 | Oka | 372/21 |
| 2007/0121689 | A1 * | 5/2007 | Brown | 372/39 |
| 2007/0236779 | A1 * | 10/2007 | Kung et al. | 359/326 |
| 2007/0253453 | A1 * | 11/2007 | Essaian et al. | 372/22 |
| 2007/0263693 | A1 * | 11/2007 | Essaian et al. | 372/75 |

FOREIGN PATENT DOCUMENTS

| | | | |
|---|---|---|---|
| JP | 2005-079084 | * | 3/2005 |

OTHER PUBLICATIONS

Shur et al., "Polarization Reversal in Congruent and Stoichiometric Lithium Tantalate", *Applied Physics Letters*, vol. 79, No. 19, pp. 3146-3148 (Nov. 2001). [Discussed at p. 5 of Applicants' Specification].

Katz et al., Vapor-Transport Equilibrated Near-Stoichiometric Lithium Tantalate for Frequency Conversion Applications, *Optics Letters*, vol. 29, No. 15, pp. 1775-1777 (Aug. 2004).

(Continued)

*Primary Examiner*—Minsun Harvey
*Assistant Examiner*—Michael Carter
(74) *Attorney, Agent, or Firm*—Buchanan Ingersoll & Rooney PC

(57) ABSTRACT

A laser is disclosed, which is suitable for efficient generation of continuous-wave laser light having a wavelength of about 400 nm or less. The short-wavelength light is generated by first frequency-doubling a fundamental wave, and then sum-frequency mixing the frequency-doubled wave and the fundamental wave. The non-linear interactions are effected by means of quasi-phasematching structures inside a resonant cavity where the fundamental wave is circulating. The sum-frequency mixing is effected using second or higher order quasi-phasematching, which allows for wider domains to be inverted for the quasi-phasematching structure compared to first order quasi-phasematching. Preferably, the sum-frequency mixing is effected using periodically poled stoichiometric lithium tantalate (PPSLT) for second or third order quasi-phasematching.

14 Claims, 2 Drawing Sheets

OTHER PUBLICATIONS

Burns et al., "Second Harmonic Generation in Field Poled, Quasi-Phase-Matched, Bulk LiNbO$_3$," *IEEE Photonics Technology Letters*, vol. 6, No. 2, pp. 252-254 (Feb. 1994).

Meyn and Fejer, "Tunable Ultraviolet Radiation by Second-Harmonic Generation in Periodically Poled Lithium Tantalate", *Optics Letters*, vol. 22, No. 16, pp. 1214-1216 (Aug. 1997).

H. Karlsson, F. Laurell, P. Henriksson and G. Arvidsson, "Frequency doubling in periodically poled RbTiOAs$_4$" Electron. Lett. 32(6): 556 (1996).

H. Karlsson and F. Laurell, "Electric field poling of flux grown KTiOPO$_4$" Appl. Phys Letts. 71(24): 3474 (1997).

V. Pasiskevicius, S. Wang, H. Karlsson, J.A. Tellefsen, and F. Laurell, "Efficient Nd:YAG laser frequency doubling with periodically poled KTP" Appl. Opt. 37(30): 7116 (1998).

F. Laurell, "Periodically poled materials for miniature light sources", Optical Materials 11, 235 (1999).

H. Karlsson, F. Laurell and L.K. Cheng, "Periodic poling of RbTiOPO$_4$ for quasi-phasematched blue light generation" Appl. Phys. Letts. 74(11): 1519 (1999).

J. Hellstrom, V. Pasiskevicius and F. Laurell, "Efficient nanosecond optical parametric oscillators based on periodically poled KTiOPO$_4$ emitting in the 1.8-2.5 µm spectral region" Opt. Letts. 24(17): 1233 (1999).

J. Hellstrom, V. Pasiskevicius, H. Karlsson and F. Laurell, "High-power optical parametric oscillation in large-aperture periodically poled KTiOPO$_4$ ", Opt. Letts. 25, 174 (2000).

J. Hellstrom, V. Pasiskevicius, H. Karlsson, JA Tellefsen and F. Laurell, "High power optical parametric oscillator with large aperture periodically poled KTiOPO$_4$ ", Trends in Optics and Photonics (TOPS) 34: 275 (2000).

J. Hellstrom, R. Clemens, V. Pasiskevicius, H. Karlsson, F. Laurell, "Real-time and in-situ monitoring of ferroelectric domains during periodic poling of KTiOPO$_4$ ", J. Appl. Phys. 90(3): 1489 (2001).

J. Hellstrom, G. Karlsson, V. Pasiskevicius and F. Laurell, "Optical parametric amplification in periodically poled KTiOPO$_4$ seeded by an Er-Yb:glass microchip laser", Opt. Letts. 26(6): 352 (2001).

S. Grilli, C. Canalias, F. Laurell, P. Ferraro, D. Alfieri, P. De Natale "Control of lateral domain spreading in congruent LiNbO$_3$ by selective proton exchange", Appl. Phys. Lett. 89 (2006).

K. Mizuuchi, A. Morikawa, T. Sugita, and K. Yamamoto, "Continous-wave ultraviolet generation at 354 nm in a periodically poled MgO:LiNbO$_3$ by frequency tripling of a diode end-pumped Nd:GdVO$_4$ microlaser" Applied Physics Letts. 85(18): 3539 (2004).

* cited by examiner

CONTINUOUS-WAVE ULTRAVIOLET LASER

TECHNICAL FIELD

The present invention generally relates to short-wavelength diode-pumped solid state lasers. More particularly, the present invention relates to continuous-wave diode-pumped solid state lasers capable of emitting wavelengths below about 400 nm.

TECHNICAL BACKGROUND

In many biomedical applications, laser light is used to induce fluorescence from biomolecules or biological substances that are studied. For example, such substances may include genes, proteins, cells and tissue. In some cases, scattering or absorption of the light is also employed in the measurements. The fluorescence is typically generated by means of a fluorophore or "biomarker" that has been chemically attached to the substances to be studied. Such fluorophores may, for example, be fluorescent proteins or dyes. The fluorophores often require excitation at a specific wavelength of light.

There is currently a trend on the biomedical instrumentation market to go from large and expensive analytical tools for research labs to more bench-top-like instruments that can address a larger range of customers. The goal for many instrument manufacturers is to move from medical research (understanding a disease) to drug development (ability to treat a disease) to clinical diagnosis (identify the disease and provide treatment). This trend is supported by the increased availability of increasingly compact and efficient laser sources. Many of the current fluorophores and instrumentation technologies have been developed around gas lasers (e.g. Argon, Krypton, Helium-Neon, Helium-Cadmium, Nitrogen) that have been available on the market since more than 30 years. However, such gas lasers suffer from large size, high energy consumption and short lifetime. The development of more compact solid-state laser alternatives enables instrument manufacturers to build smaller, more powerful and more robust systems, targeting larger-volume markets. This is an important growth driver in the biotech field and the overall market for solid-state lasers in general.

One requirement for the new solid-state lasers is to match the wavelengths provided by the gas lasers, since shifted wavelengths would require development of completely new fluorophores. In addition, it is desirable that the laser technology should be scalable in power, because higher powers are generally needed in order to reach higher resolutions and higher processing speeds.

Most of the currently used fluorophores are excited using light within the visible range of the electromagnetic spectrum. However, there is a growing demand for excitation in the ultraviolet range, e.g. for stem cell research and for increased DNA content resolution. Fluorophores that require excitation in the ultraviolet include, for example, DAPI, PE and Hoechst Blue. The use of these fluorophores is of particular interest in flow cytometry and confocal microscopy. The ideal excitation wavelength for these fluorophores is about 340-360 nm.

Light in the wavelength range around 350-365 nm can, as a first example, be obtained from Argon/Krypton gas lasers. However, as explained above, such gas lasers are typically rather bulky and suffer from a large energy consumption and short operating lifetime.

Another alternative to obtain the required excitation light could be to use a solid-state laser. One such conceivable approach for obtaining ultraviolet excitation light is to use GaN-based diode lasers emitting at 375 nm, but such lasers suffer from insufficient performance in terms of beam quality and lifetime. Another problem of such diode lasers is that the emission wavelength of about 375 nm is slightly too long for optimal excitation.

Wavelength converted diode-pumped solid-state lasers (DPSSLs) are also potentially possible sources of excitation light in the ultraviolet wavelength range. However, in order to reach a reasonable conversion efficiency for the wavelength conversion, such lasers typically need to be pulsed.

For example, a DPSSL may be Q-switched in order to produce pulses of high power, such that frequency conversion into the ultraviolet range can be made with a fairly good conversion efficiency. However, Q-switched lasers are not suitable for many of the targeted biomedical applications due to their non-continuous character, leading to poor resolution in many cases.

An alternative to a Q-switched laser could be a mode locked laser. Mode locked lasers are sometimes referred to as being quasi-continuous, in the sense that the repetition rate for the output pulses is so high that, for many applications, it can be considered almost continuous. Mode locked lasers emit pulses of rather high power, that could be sufficient for practical frequency conversion into the ultraviolet. However, a mode locked laser is a comparatively complex laser system, which makes it bulky and expensive.

In view of the foregoing, it can be appreciated that a novel source of ultraviolet laser light is needed. In particular, it would be beneficial to have a compact laser that is capable of emitting continuous-wave laser light at reasonable powers for wavelengths below 400 nm.

SUMMARY OF THE INVENTION

The present invention provides a concept for a solid-state laser facilitating generation of continuous-wave light at wavelengths below 400 nm It should be understood, however, that the inventive concept may be employed also for generation of longer wavelengths.

Generally, the present invention is based on the principle of converting a fundamental wave of radiation into a frequency-doubled wave of radiation, and then mixing said fundamental wave and said frequency-doubled wave to generate a frequency-tripled wave of radiation.

When designing a continuous-wave frequency converted laser, it is a challenge to obtain sufficient output power at the frequency-converted wavelength. To this end, it is here proposed to use quasi-phasematching for the non-linear interactions ultimately producing the short-wavelength light. The use of quasi-phasematching gives access to a higher non-linearity compared to the conventional birefringent phasematching using, for example, LBO or BBO. Moreover, quasi-phasematching is typically free from walk-off, which is known to be a limiting factor in conventional phasematching.

According to this invention, mixing of the fundamental wave and the frequency-doubled wave to generate the frequency-tripled wave of radiation is effected by a quasi-phasematching structure of second or higher order. This is a particularly useful feature of the present invention, since it allows for the use of a grating structure having a larger period compared to a grating designed for first order quasi-phasematching. By avoiding the use of very fine-pitch gratings in this manner, i.e. by using higher-order quasi-phasematching, the non-linear element for generating the frequency-tripled wave can be manufactured in a simple, reliable and cost-efficient way.

It may be preferred to use periodically-poled, magnesium-doped stoichiometric lithium tantalate (PPSLT), or MgO:LiTaO$_3$, particularly for the second non-linear element. The MgO content is suitably about 1%. This material has proven to be very useful in non-linear processes in which short-wavelength light is generated. Firstly, SLT is transparent all the way down towards 270 nm, and secondly exhibits a high non-linearity. The material also has attractive characteristics with respect to damage resistance at high power levels. Moreover, the material has a sufficiently low coercive field in order for it to be conveniently periodically poled by electric field poling. For a scientific background, reference is made to "Polarization reversal in congruent and stoichiometric lithium tantalate", by V. Ya. Shur et al., Applied Physics Letters, Vol. 79, No. 19, pp. 3146-3148 (Nov. 2001).

For second order quasi-phasematching, the optimal duty cycle is 75/25. This facilitates the manufacturing process, since one may choose to domain invert the larger part (75%) of each period. As known within the art, the conversion efficiency for a quasi-phasematched non-linear process decreases with the square of the quasi-phasematching order. For example, in quasi-phasematching of the second order the effective non-linear coefficient decreases by a factor of 4 compared to the corresponding first-order process, and if third order quasi-phasematching is used, the effective non-linear coefficient decreases by a factor of 9 compared to the corresponding first-order process. Therefore, second order quasi-phasematching could be preferred already for this reason. Considering also the fact mentioned above, that 75% of each period should be domain inverted, second-order quasi-phasematching becomes indeed an attractive alternative.

The frequency-tripled wave could also be generated using third order quasi-phasematching. However, and as described above, the effective non-linear coefficient would decrease by a factor of 9 compared to a first order process. Nevertheless, third-order quasi-phasematching could still be attractive, since it may be found convenient to have a 50/50 duty cycle for the periodically-poled structure from a fabrication point of view.

Further, conversion of the fundamental wave of radiation into a frequency-doubled wave of radiation is preferably effected by a quasi-phasematching structure of the first order in order to maximize the conversion efficiency, although it is conceivable to use higher order quasi-phasematching for generating the frequency-doubled wave. The are various alternatives for implementing the quasi-phasematching structure generating the frequency-doubled wave, as generally known in the art. One preferred example amongst others is periodically-poled potassium-titanyl-phosphate (PPKTP). The use of quasi-phasematching for frequency-doubling is widely known, and need not be described in detail here.

Both the first and the second non-linear elements are arranged within a resonant cavity for the fundamental wave. In this manner, the high intensity of radiation within the resonant cavity is available for the generation of the frequency-doubled and the frequency-tripled waves. Such arrangement of the non-linear elements inside the resonant cavity is called an intra cavity configuration.

Suitably, the first and second non-linear elements may be implemented as separate regions in a common body. In this manner, the number of optical interfaces in the cavity is reduced and optical losses are minimized. This may provide for higher output powers for the frequency-tripled wave, and save costs in production. In such case, the non-linear material needs to be transparent for all the interacting waves. For example, PPSLT may then be used.

Although it may be preferred to have the first and second non-linear elements both located in the second branch of the cavity, it is also conceivable to have one of the non-linear elements located in the second branch and the other in the third branch.

This invention is particularly designed for generation of an output beam (frequency-tripled wave) having a wavelength of about 400 nm or less. In other words, the fundamental wave of radiation generated by the active body in the resonant cavity should be capable of emitting radiation having a wavelength of about 1200 nm or less when excited. In one preferred embodiment, the fundamental wave has a wavelength of about 1064 nm, thus yielding a frequency-doubled wave at about 539 nm and a frequency-tripled wave in the ultraviolet range at about 355 nm.

Preferably, the active body of the laser is pumped by means of a diode laser. In a preferred embodiment, the active body (gain medium) comprises a neodymium-doped crystal which can be optically pumped using a wavelength of about 810 nm.

It is also preferred to have the resonant cavity divided into at least three separate branches. To this end, the cavity may be defined by a first and a second end mirror and a first and a second folding mirror. A first branch is located between the first end mirror and the first folding mirror, a second branch is located between the first and the second folding mirrors, and a third branch is located between the second folding mirror and the second end mirror. The active body for generating the fundamental wave may suitably be located in the first branch, and the first and second non-linear elements may suitably be located in the second branch. All mirrors are designed for high reflection at the fundamental wave, in order to maximize the intensity of the fundamental wave circulating within the cavity. By maximizing the intensity of the fundamental wave and by arranging the non-linear elements within the cavity, the conversion efficiency for the generation of the frequency-doubled wave and the frequency-tripled wave is enhanced.

The cavity is further designed such that the frequency-doubled wave and the frequency-tripled wave are let out from the cavity as soon as possible. More particularly, the folding mirrors are preferably both made transparent to the frequency-doubled wave and to the frequency-tripled wave.

In order to increase the stability of the laser, and in order to provide for efficient frequency conversion, the cavity preferably includes a wavelength filter, such as a Lyot filter. Lyot filters are per se known in the art, and need not be explained in detail here. Most preferably, such Lyot filter is located in the third branch of the cavity. By locating the Lyot filter in a separate branch of the cavity, performance is improved and, in particular, temperature control of the Lyot filter components is simplified. In this context, it should be noted that the birefringent crystal for the Lyot filter is separate from any of the frequency-converting crystals.

BRIEF DESCRIPTION OF THE DRAWINGS

In the detailed description given below, reference is made to the accompanying drawings, on which.

In the figures, similar elements or parts are designated by the sane reference numerals throughout.

Figure 1:
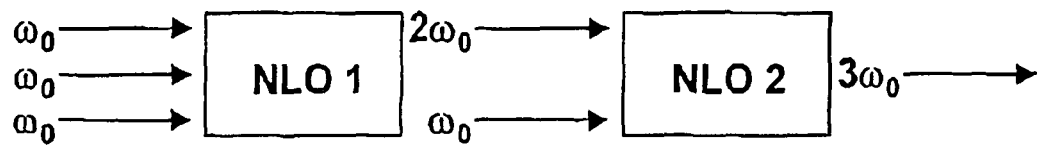
FIG. 1 schematically illustrates the non-linear interactions employed according to the present invention.

It will be understood that the embodiments shown on the drawings are merely illustrative examples, and that various modifications and additions/alterations can be made without departing from the spirit and scope of the invention.

DETAILED DESCRIPTION OF EMBODIMENTS

Before going into a detailed description of the preferred embodiments shown on the drawings, one laser according to the present invention will be explained in general terms.

A laser according to the present invention may be designed for emission at 355 nm (i.e. ultraviolet laser light). A diode laser for pumping at 808 nm is used to provide energy to the active body (gain medium of the laser), which is comprised of Nd:YVO$_4$. Laser emission at 1064 nm is obtained by using a resonant optical cavity in a folded configuration enclosing the Nd:YVO$_4$ crystal. Two non-linear optical elements are placed inside the resonant cavity. The first non-linear element is designed for optimum frequency conversion of the 1064 nm radiation to 532 nm (i.e. frequency doubling), and the second non-linear element is designed for optimum frequency conversion (sum frequency mixing) of the 1064 nm radiation and the 532 nm radiation to 355 nm. Good beam quality is ensured by using a curved end mirror for stabilizing the resonant cavity. Low intensity noise is ensured by forcing the laser to operate in a single longitudinal mode using one or more spectral filters placed inside the resonant cavity. Suitably, the spectral filter is a Lyot filter. Power efficiency of the laser is improved compared to previous designs by combining intracavity frequency conversion with the use of periodically poled (PP) crystals for the non-linear elements. PP-materials (quasi-phasematched frequency conversion) generally provide higher non-linear coefficients than conventional non-linear material (using birefringent phasematching). Another attractive advantage of this quasi-phasematched frequency conversion is that all interacting waves propagate in the same polarization. This eliminates any problems relating to polarization-mode competition within the resonant cavity and walk-off (angular separation of the different wavelengths due to dispersion in the material) It also helps to increase the efficiency of cascaded processes, since the interacting waves are not arbitrarily polarization-rotated with respect to each other. For the frequency conversion in the first non-linear element, i.e. for generation of the frequency-doubled wave, a periodically poled crystal of KTP is used. However, for the second non-linear element, KTP is not a good choice, since the lower edge of the transparency window for KTP appears at about 400 nm. Rather, the second non-linear element is in this embodiment a periodically poled crystal of magnesium-doped stoichiometric lithium tantalate (PPSLT), which is transparent down to about 270 nm. Periodic poling of a grating structure suitable for quasi-phasematching of a non-linear process generating ultraviolet light is very challenging, since the required grating period is very short (less than 2 µm). Therefore, the second non-linear element comprises a higher-order quasi-phasematched structure (preferably second or third order). This relaxes the demands on the periodic poling, but reduces the effective non-linear coefficient, as described in the summary above. Forever, since the typically highest non-linear coefficient becomes available for quasi-phasematching, the process is still more efficient than birefringent phasematching. As a realistic example, using a pump power of about 4 W, it is possible to achieve a power level of at least about 15-20 W for the intra-cavity field circulating within the resonant cavity at 1064 nm. From this circulating wave, more than 300 mW of light at 532 nm can be generated in the first non-linear element. Using 15-20 W of light at 1064 nm and 300 mW of light at 532 nm, more than 15 mW of light at 355 nm can realistically be generated in an 8 mm long periodically poled MgO:LiTaO$_3$ crystal. Notably, the circulating wave at 1064 nm is continuous (i.e. not pulsed), and thus also the generated light at 355 nm is continuous. The overall conversion efficiency obtained by the inventive laser can be made, according to a reasonable estimate, more than three times that of a laser using conventional birefringent phasematching in LBO or BBO.

Referring to the drawings, some preferred embodiments will be described in more detail.

The non-linear processes for generating a frequency-tripled wave is schematically illustrated in FIG. 1. A fundamental wave having a fundamental frequency $\omega_0$ is launched into a first non-linear element NLO 1. In NLO 1, the fundamental wavelength is frequency doubled into a frequency-doubled wave $2\omega_0$ which is launched, together with remnant radiation of the fundamental wave, into a second non-linear element NLO 2. In NLO 2, the frequency-doubled wave $2\omega_0$ is sum-frequency mixed with the remnant wave of the fundamental frequency $\omega_0$ to generate a frequency-tripled wave $3\omega_0$.

Figure 2:
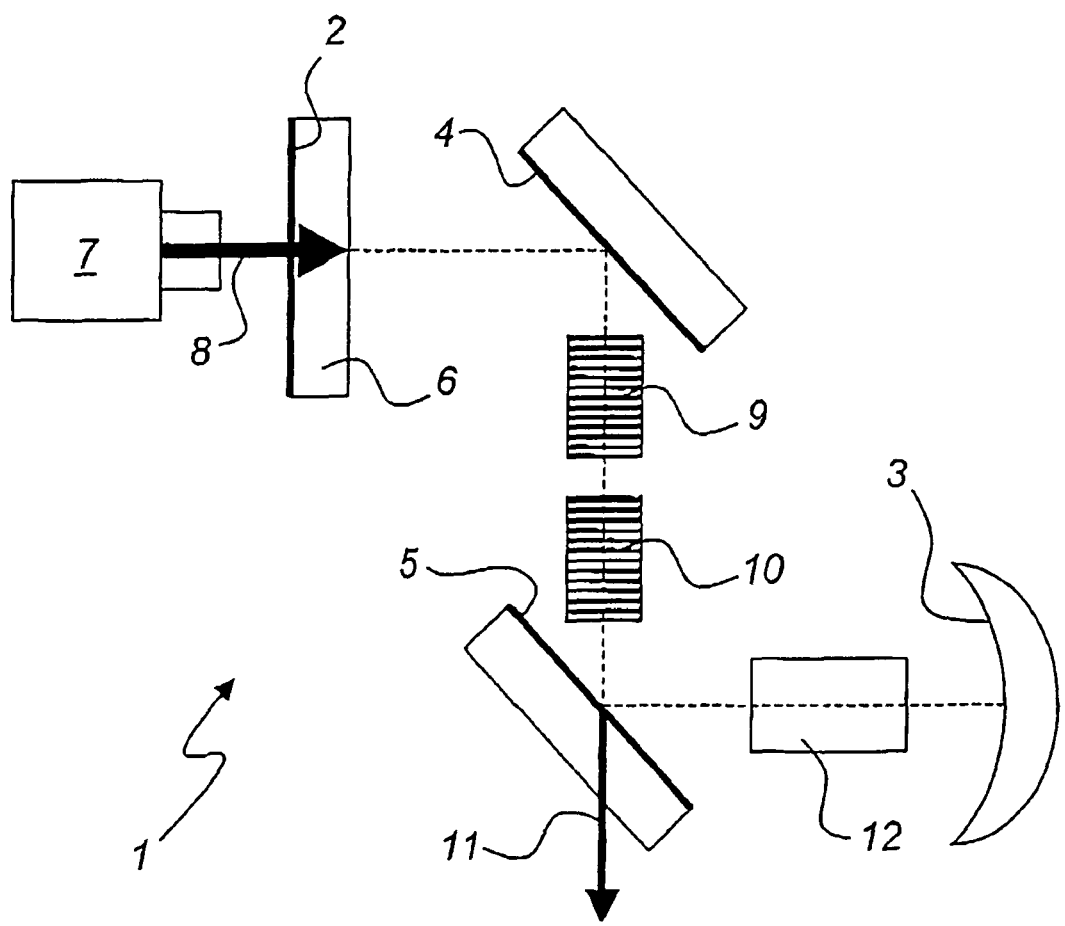
FIG. 2 schematically shows one embodiment of a laser according to the present invention.

Turning now to FIG. 2 of the drawings, there is schematically shown a laser 1 according to a first preferred embodiment of the present invention. The laser 1 shown in this figure comprises a resonant cavity defined by a first end mirror 2 and a second end mirror 3, and a first folding mirror 4 and a second folding mirror 5. As indicated in the figure, the second end mirror 3 is a curved mirror in order to improve stability of the optical field resonating within the cavity. This folded geometry divides the cavity into three branches: a first branch between the first end mirror 2 and the first folding mirror 4; a second branch between the first folding mirror 4 and the second folding mirror 5; and a third branch between the second folding mirror 5 and the second end mirror 3.

In the first branch of the cavity, there is located an active material (active body) 6, which is capable of emitting a fundamental wave of radiation when excited. In this embodiment, the active material is a neodymium-doped crystal of yttrium-orthovanadate (Nd:YVO$_4$). The emission from Nd:YVO$_4$ is strongly polarized, which is an advantage for the quasi-phasematching as well as for the single longitudinal mode operation (to be described in more detail below).

The active material 6 is excited (pumped) by means of a diode laser 7, which emits suitable pumping radiation at about 810 nm. The pumping radiation is incident into the active material 6 through the first end mirror 2, as indicated by arrow 8 in FIG. 2. When excited by the pump, the active material emits a fundamental wave of radiation at 1064 nm, which starts to circulate, or oscillate, within the cavity. All the mirrors 2, 3, 4 and 5 are made highly reflecting at 1064 nm in order to maximize the intensity of the fundamental wave circulating within the resonant cavity. The path inside the cavity for the circulating wave at 1064 nm is indicated by the broken line in FIG. 2.

In the second branch of the cavity, there is located a first and a second non-linear element 9 and 10. During propagation from the first folding mirror 4 towards the second folding mirror 5, the fundamental wave is converted by the first non-linear element 9 into a frequency-doubled wave having a wavelength of 532 nm. This frequency-doubled wave continues to propagate towards the second folding mirror 5 together with a remnant part of the fundamental wave that was not frequency doubled in the first nor-linear element 9. Hence, light of the fundamental wave and light of the frequency-doubled wave enter the second non-linear element 10, and is sum-frequency mixed into a frequency-tripled wave having a wavelength of 355 nm.

The second folding mirror 5 is designed to be transparent at both 532 nm and 355 nm, in order to let the remnants of the frequency-doubled wave and the frequency-tripled wave out from the cavity in the form or an output beam, as illustrated by arrow 11. If required or desired, light at 355 nm can easily be separated from light at 532 nm in the output beam using a dichroic mirror or any similar filtering element.

In the third branch of the cavity, there is located a Lyot filter arrangement 12. The principle of the Lyot filter is explained in international patent application publication WO 2006/135318, entitled "Frequency-Stabilized Laser Source", which is incorporated herein by reference. The Lyot filter forces the fundamental wave inside the resonant cavity to oscillate in a single longitudinal mode, which greatly enhances the stability and the efficiency of the laser. It has now also been found that the stability of the filter can be greatly enhanced by having the birefringent Lyot filter crystal separate from the frequency-converting crystals. The Lyot filter is therefore advantageously positioned in a separate branch of the cavity.

The first non-linear element 9, which has the purpose of converting the fundamental wave into a frequency-doubled wave, is comprised of a periodically-poled crystal of KTP ($KTiOPO_4$), or in short PPKTP. The PPKTP is structured for first order quasi-phasematching of the non-linear process of frequency-doubling the fundamental wave. The duty cycle of the PPKTP is 50/50, meaning that inverted domains and non-inverted domains are of the same size. In essence, the first non-linear element 9 is a "standard" PPKTP according to the prior art for frequency-doubling a fundamental wave at 1064 nm into a wave at 532 nm.

The second non-linear element 10, which has the purpose of converting the fundamental wave at 1064 nm together with the frequency-doubled wave at 532 nm (by sum-frequency mixing) into a frequency-tripled wave at 355 nm, is a periodically-poled crystal of magnesium-doped stoichiometric lithium tantalate ($MgO:LiTiO_3$), or in short PPSLT. The PPSLT is structured for third order quasi-phasematching of the sum-frequency mixing of the 1064 nm wave and the 532 nm wave into the frequency-tripled 355 nm wave. By structuring the PPSLT of the second non-linear element for third order quasi-phasematching the period of the grating becomes about 6.6 μm. This means that a domain that is 3.3 μm wide needs to be inverted in order to obtain the quasi-phasematching structure, considering that the optimal duty cycle is 50/50. Periodic poling of domains of this size is a fairly straightforward procedure. However, if it would be attempted to structure the PPSLT for first order quasi-phasematching, the grating period Λ would be 2.2 μm, meaning that a domain that is 1.1 μm wide needs to be inverted—a very challenging task indeed. Thus, the present invention greatly relaxes the constraints on the process for periodic poling by employing higher orders for the quasi-phasematching of the sum-frequency mixing in the second non-linear element.

Figure 4:
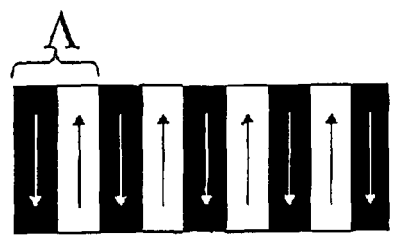
FIGS. 4 and 5 schematically show periodically poled domains in a non-linear element for a 50/50 duty cycle and a 75/25 duty cycle, respectively.
Figure 5:
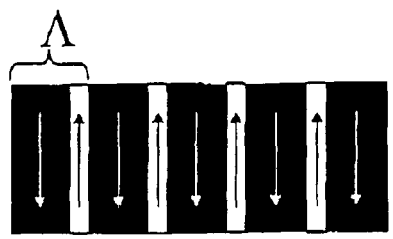

In an alternative embodiment, the second non-linear element 10 is structured for second order quasi-phasematching of the sum-frequency mixing of the 1064 nm wave and the 532 nm wave into the frequency-tripled 355 nm wave. For second order quasi-phasematching, the optimal duty cycle is 75/25. This means that domains of either 25% or 75% of the grating period need to be inverted. For second order quasi-phasematching of the sum-frequency mixing of 1064 nm and 532 nm into 355 nm, the grating period is about 4.4 μm in PPSLT. Since it is difficult to obtain good periodic poling of narrow domains, it would be a natural choice to domain invert 75% of the grating period. This means that a domain that is 0.75×4.4 μm=3.3 μm wide needs to be inverted. Hence, using second order quasi-phasematching, the size of the domains to be inverted is the same as for third order quasi-phasematching. In addition, second order quasi-phasematching only lowers, in comparison to the first order process, the effective non-linear coefficient by a factor of 4, compared to third order quasi-phasematching, which lowers the effective non-linear coefficient by a factor of 9. This principle is illustrated in FIGS. 4 and 5, where FIG. 4 shows schematically a 50/50 duty cycle grating for quasi-phasematching, and FIG. 5 shows schematically a 75/25 duty cycle for quasi-phasematching. It is evident that a 75/25 duty cycle provides the opportunity to invert a wider domain, i.e. 75% of the grating period Λ.

Figure 3:
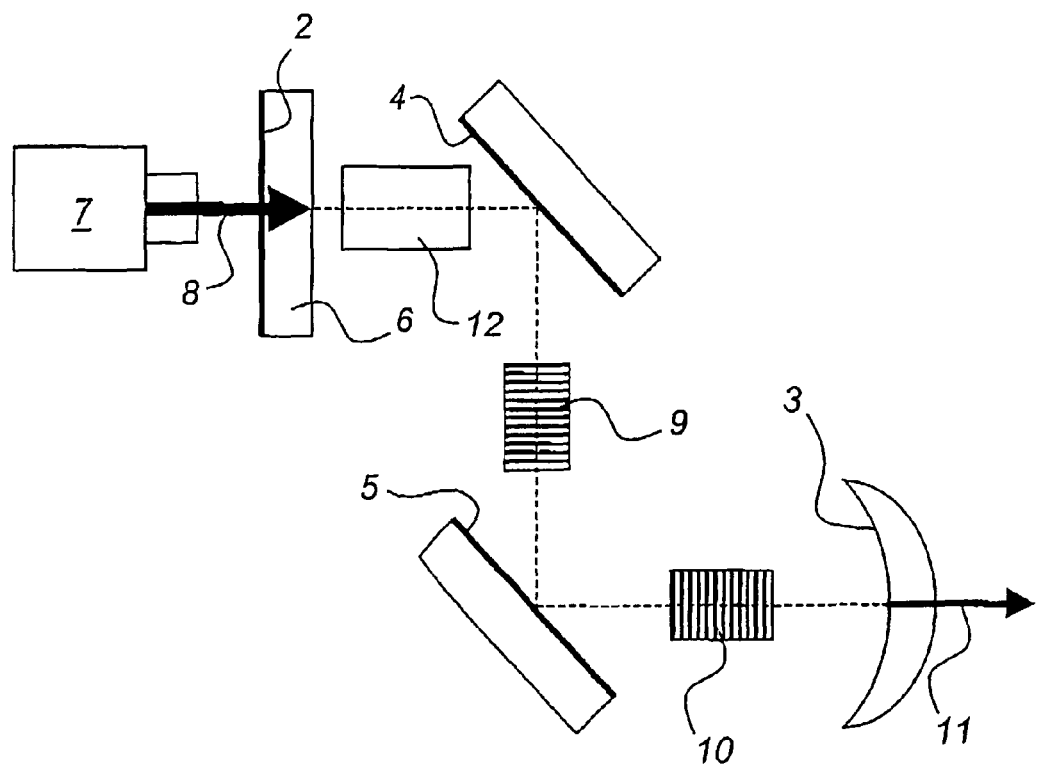
FIG. 3 schematically shows another embodiment of a laser according to the present invention.

FIG. 3 shows schematically another embodiment, which is similar to the embodiment shown in FIG. 1. However, in the embodiment of FIG. 3, the Lyot filter 12 is located in the first branch of the cavity, the first non-linear element 9 is located in the second branch of the cavity, and the second non-linear element 10 is located in the third branch of the cavity. In this embodiment, the second end mirror 3 is suitably made transparent for the frequency-doubled wave at 532 nm and for the frequency-tripled wave at 355 nm. Thus, an output beam is emitted as indicated by arrow 11 in the figure. In other aspects, the embodiment of FIG. 3 is similar to the embodiment shown in FIG. 2.

In the description above, generation of laser light at 355 nm has been taken as an example. However, it will be appreciated that the inventive concepts disclosed herein can be employed also for other wavelengths. Generally, the described laser is suitable and advantageous for generation of wavelengths about or less than 400 nm. For longer wavelengths, it may not be required or preferred to use higher order quasi-phasematching for the sum-frequency generation according to the present invention. Nevertheless, this does not exclude the present invention from being used also for longer wavelengths.

There are many available laser materials for the active body 6. For example, the active body may comprise Nd:YAG, $Nd:YVO_4$, Nd:YLF, $Nd:YAlO_3$ (Nd:YAP), $Nd:GdVO_4$, or Nd:Glass. The active body 6 may alternatively comprise ytterbium (Yb) doped into a host material.

In addition, although PPSLT has been disclosed as the preferred non-linear element for sum-frequency mixing, there are numerous other materials that may be periodically poled and used in the present invention. Preferably, however, any material used should be transparent for wavelengths below about 400 nm.

CONCLUSION

A laser is disclosed, which is suitable for efficient generation of continuous-wave laser light having a wavelength of about 400 nm or less. The short-wavelength light is generated by first frequency-doubling a fundamental wave, and then sum-frequency mixing the frequency-doubled wave and the fundamental waste. The non-linear interactions are effected by means of quasi-phasematching structures inside a resonant cavity where the fundamental wave is circulating. The sum-frequency mixing is effected using second or higher order quasi-phasematching, which allows for wider domains to be inverted for the quasi-phasematching structure compared to first order quasi-phasematching. Preferably, the sum-frequency mixing is effected using periodically poled stoichiometric lithium tantalate (PPSLT) for second or third order quasi-phasematching.

The invention claimed is:

1. A laser, comprising:
   an active body capable of emitting a fundamental wave of radiation when excited, said fundamental wave of radiation having a fundamental wavelength;
   a resonant cavity enclosing said active body, said resonant cavity being resonant for said fundamental wave of radiation;
   a spectral filter to make the fundamental wave of radiation oscillate in a single longitudinal mode within said resonant cavity;
   a pump source for exciting said active body;
   a first non-linear element capable of converting said fundamental wave of radiation into a frequency-doubled wave of radiation having a wavelength that is half of said fundamental wavelength, said first non-linear element comprising a quasi-phasematching structure;
   a second non-linear element capable of mixing said Fundamental wave of radiation and said frequency-doubled wave of radiation into a frequency-tripled wave of radiation having a wavelength that is one third of said fundamental wavelength, said second non-linear element comprising a quasi-phasematching structure of third order;
   wherein the first and the second non-linear bodies are both arranged within said resonant cavity;
   wherein the laser is operative to emit said frequency-tripled wave as a continuous wave of radiation; and
   wherein the fundamental wavelength is shorter than about 1200 nm, the laser thus producing a frequency-tripled wave having a wavelength shorter than about 400 nm.

2. The laser of claim 1, wherein the resonant cavity is defined by a first and a second end mirror and a first and a second folding mirror, such that the resonant cavity comprises a first branch between the first end mirror and the first folding mirror, a second branch between the first folding mirror and the second folding mirror, and a third branch between the second folding mirror and the second end mirror, said first and second end mirrors and said first and second folding mirrors all being designed to provide high reflection for said fundamental wave of radiation.

3. The laser of claim 2, wherein said active body is located in said first branch.

4. The laser of claim 3, wherein the first non-linear element is located in the second branch, and the second non-linear element is located in the third branch.

5. The laser of claim 1, wherein said pump source is a diode laser.

6. The laser of claim 1, wherein said active body is a neodymium-doped material.

7. The laser of claim 1, wherein said first non-linear element is a periodically-poled crystal of potassium-titanyl-phosphate (PPKTP).

8. The laser of claim 1, wherein said first non-linear element is a periodically-poled crystal of stoichiometric lithium tantalate (PPSLT).

9. The laser of claim 8, wherein said PPSLT is doped with MgO.

10. The laser of claim 1, wherein said second non-linear element is a periodically-poled crystal of stoichiometric lithium tantalate (PPSLT).

11. The laser of claim 10, wherein said PPSLT is doped with MgO.

12. The laser of claim 1, wherein the fundamental wavelength is about 1064 nm.

13. The laser of claim 1, wherein the active body comprises Nd:YAG, Nd:YVO$_4$, Nd:YLF, Nd:YAlO$_3$ (Nd:YAP), Nd:GdVO$_4$, or Nd:Glass.

14. The laser of claim 1, wherein the spectral filter is a Lyot filter.

* * * * *